Dec. 24, 1940. W. J. ROSENBLOOM 2,225,800
ELECTROLYTIC CELL
Filed Oct. 14, 1937 3 Sheets-Sheet 2

INVENTOR
WILLIAM J. ROSENBLOOM
BY J. D. O'Connell
ATTORNEY

Dec. 24, 1940.   W. J. ROSENBLOOM   2,225,800
ELECTROLYTIC CELL
Filed Oct. 14, 1937   3 Sheets-Sheet 3

INVENTOR
WILLIAM J. ROSENBLOOM
BY J. D. O'Connell
ATTORNEY

Patented Dec. 24, 1940

2,225,800

UNITED STATES PATENT OFFICE 2,225,800

ELECTROLYTIC CELL

William J. Rosenbloom, Trail, British Columbia, Canada

Application October 14, 1937, Serial No. 169,003

2 Claims. (Cl. 204—258)

This invention relates to improvements in electrolytic cells used in the commercial production of oxygen and hydrogen by the electrolysis of water.

An important feature of the invention resides in a novel construction and arrangement of electrodes which simplifies the inter-cell electrical connections and makes possible the elimination of a considerable amount of the electrode insulation heretofore required.

Another feature consists in the provision of a generally improved construction which may be readily assembled or dismantled and in which the electrodes and diaphragm elements are arranged so that they are readily accessible for repair or replacement.

Another feature of the invention consists in the provision of a novel arrangement of diaphragm frames to which the diaphragms are secured so that they are held against flapping or clinging to the electrodes.

Proceeding now to a more detailed description reference will be had to the accompanying drawings wherein Fig. 1 is a top plan view of a tank type electrolyzer designed in accordance with this invention with the gas collectors removed.

Figure 1:
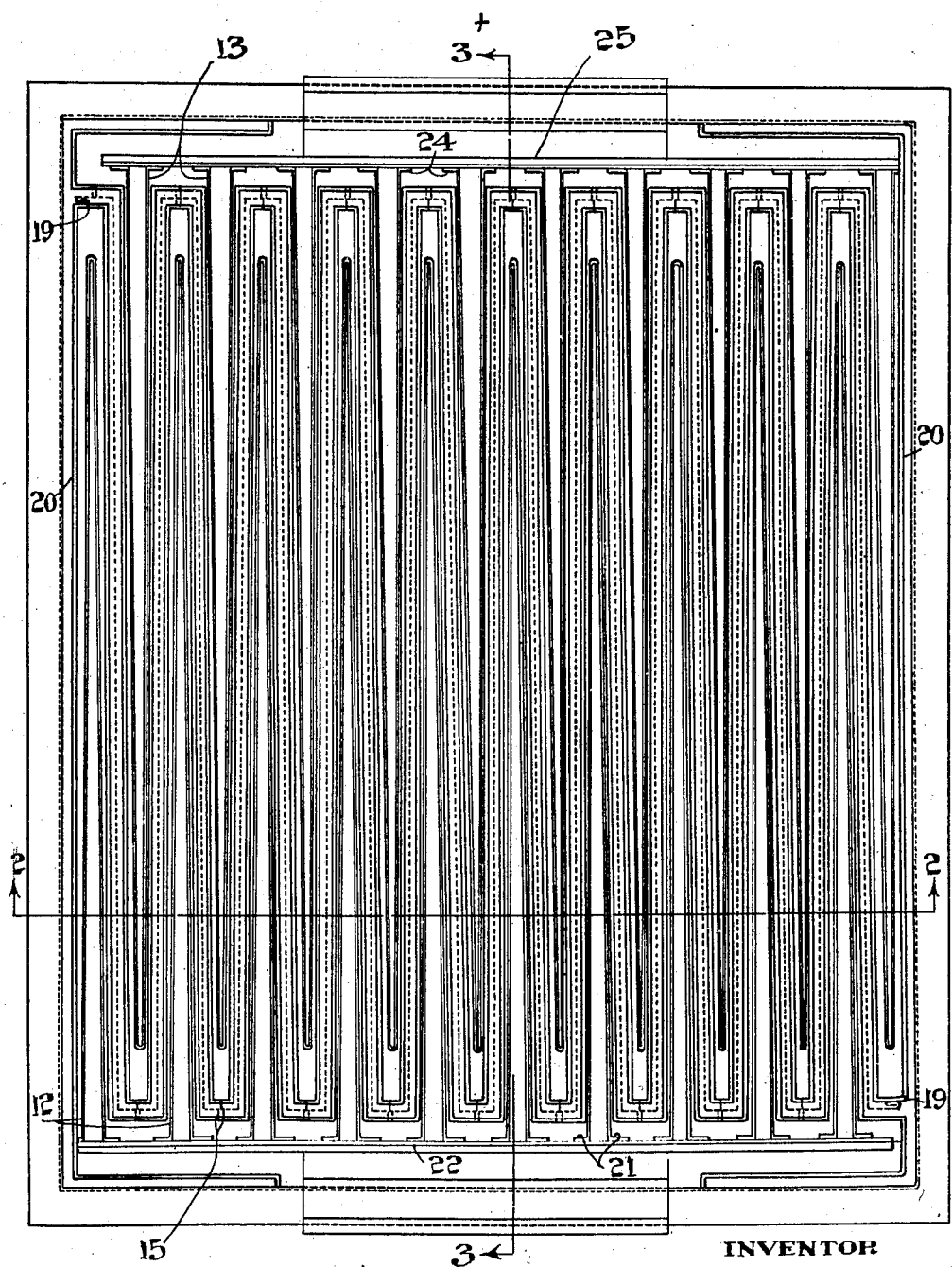
Figure 2:
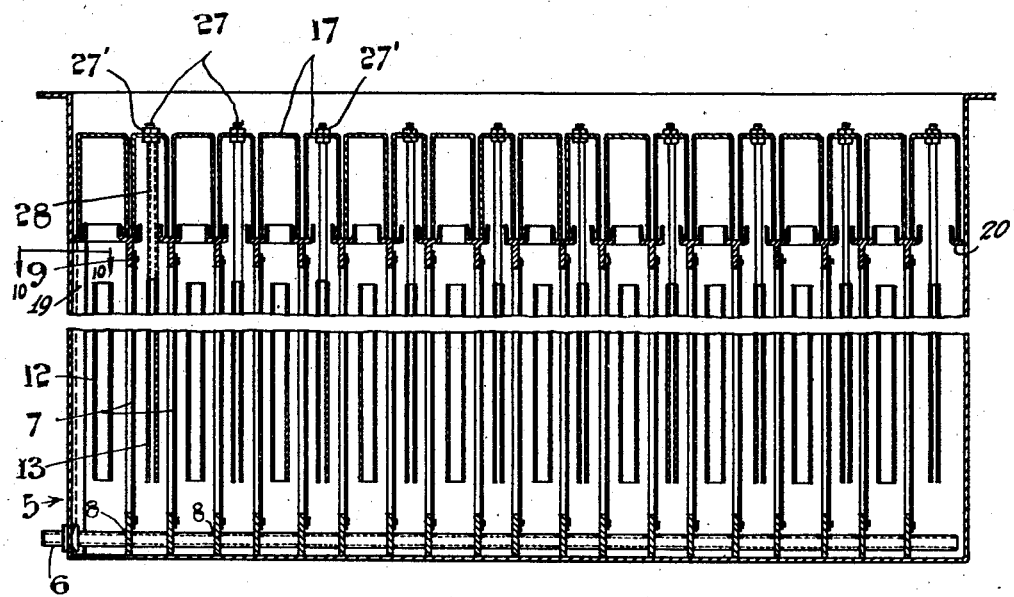
Fig. 2 is a transverse sectional view of the assembled cell along the line 2—2 of Fig. 1.
Figure 7:
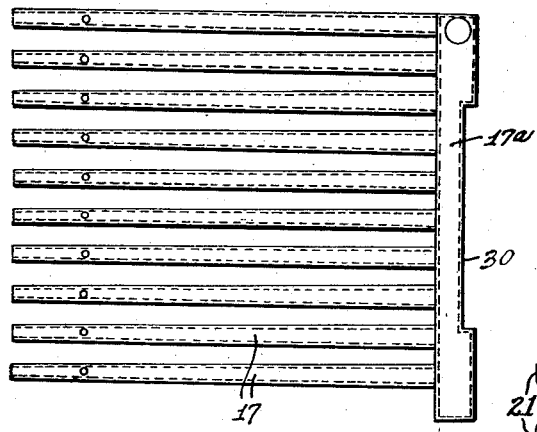
Fig. 7 is a top plan view of one of the gas collectors.
Figure 10:
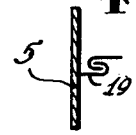
Fig. 10 is a fragmentary sectional view taken along the line 10—10 of Fig. 2.
Figure 9:
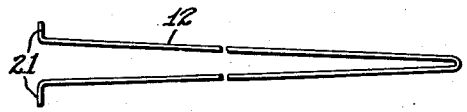
Fig. 9 is a view of one of the electrodes.
Figure 8:
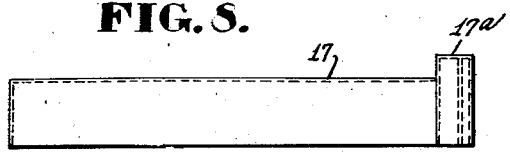
Fig. 8 is a side elevation of the collector appearing in Fig. 7.
Figure 4:
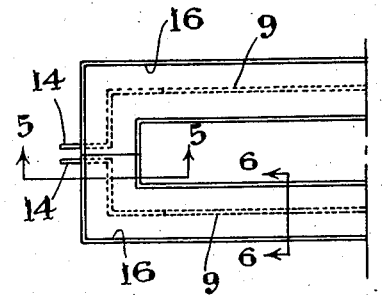
Fig. 4 is a top plan view of a portion of the diaphragm frame structure.
Figure 5:
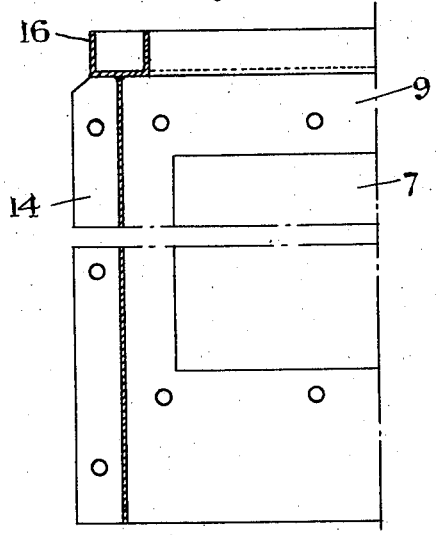
Fig. 5 is a sectional view taken along the line 5—5 of Fig. 4.
Figure 6:
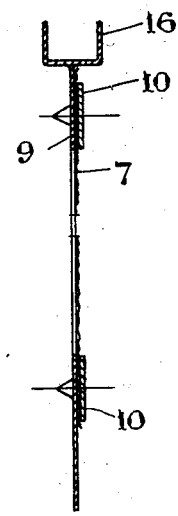
Fig. 6 is a sectional view taken along the line 6—6 of Fig. 4.
Figure 3:
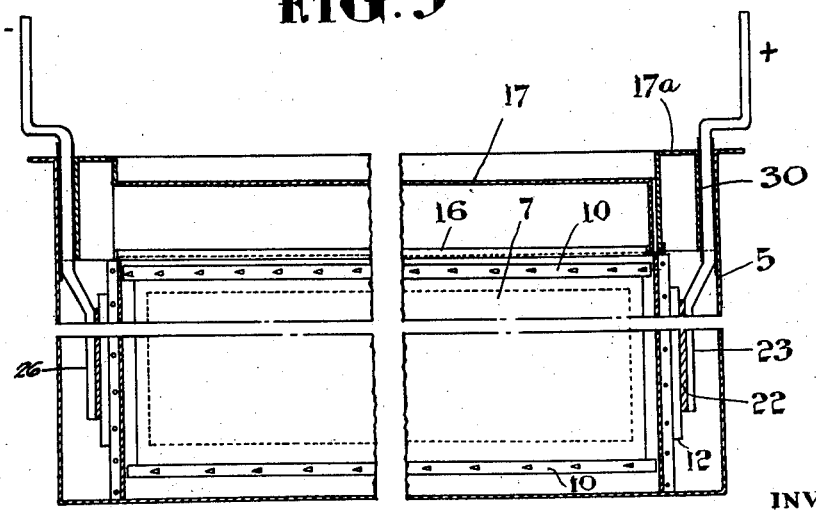
Fig. 3 is a sectional view along the line 3—3 of Fig. 1.

Referring more particularly to the drawings, 5 designates a tank to which feed water is supplied through a pipe 6. This pipe enters the tank at one side and extends horizontally along the bottom to a point close to the opposite side of the tank. Pipe 6 is provided, at points directly below the diaphragms 7, with openings 8 through which the feed water enters the cell directly below each diaphragm. The size of openings 8 should be such that distribution of the feed water is substantially uniform. Each diaphragm 7 is secured over an opening formed in one of the diaphragm frames 9. As shown more clearly in Fig. 6, opposite edges of each diaphragm 7 are clamped to its associated diaphragm frame by suitable clamping strips 10. The diaphragm frames 9 are removably connected at alternate ends in end to end relation to form an interwinding diaphragm structure between the hollow, nickle plated anodes 12 and cathodes 13. In this connection it will be noted that each frame is provided with flanges 14 and 15 which are bolted to the corresponding flanges of adjacent frames. As shown to advantage in Fig. 1 a channel, continuous with the upper edge of the tortuous diaphragm structure, is provided by means of mating channel sections 16 carried at the upper edges of the diaphragm frames. Two gas collectors 17a, such as shown in Figs. 3, 7 and 8, are reversely arranged in the tank so that the arms 17 of one collector fit between the arms of the companion collector. Each gas collector 17a comprises a main gas collecting header adapted to lie at one side of the cell and a set of laterally extending gas collecting arms 17 adapted to extend across the cell above each anode or cathode and to collect the gas generated thereby. Each gas collecting arm 17 is trough shaped in cross section and has depending side walls. The lower edges of these side walls are adapted to seat in the channels 16 at the tops of the diaphragm frames 9. It will thus be seen that in the assembled structure illustrated in Fig. 2 the gas collectors 17a rest upon the tops of the diaphragm frames 9 with the depending sides of their gas collecting arms 17 seated in and supported by the channels 16.

The ends of the tortuous diaphragm structure formed by the series of interconnected frames 9 are connected to opposite ends of the tank by means of vertical U irons indicated at 19. The bottom of the tank may also be provided with any suitable form of spacing lugs or other devices for holding in properly spaced relation the lower edges of the diaphragm frames 9 which rest upon it. Horizontal angles 20 are also welded to the inner surface of the tank to form channels in which portions of the gas collectors are seated as shown in Fig. 2.

Each anode 12 comprises a metal plate bent in the form of a V and provided with attaching lips 21 by which it is welded or otherwise rigidly secured to a metallic current distributing plate 22 which serves to distribute electric current uniformly to all of the anodes. The plate 22 extends down deeply enough to provide ample contact to the anodes 12 and is connected to a nickel plated copper busbar connection 23. Because of this arrangement the relatively large current distributing plate 22 delivers a uniform amount of current throughout the entire depth of the electrodes, thus insuring maximum electrode efficiency throughout the entire cell.

Each cathode 13 also comprises a V-shaped metal plate having attaching lips 24 fastened to a current distributing plate 25 similar to the plate 22 which, in turn, is equipped with a busbar connection 26, similar to that described in connection with the anodes.

The V-shaped electrodes 12 and 13 may be replaced by U-shaped electrodes or other suitable hollow electrodes through which the electrolyte may be circulated as hereinafter described.

As shown in Fig. 2, the cathodes 13 are suspended by supporting rods 27 from the inverted troughs 17 of one of the gas collectors 17a. The anodes are similarly suspended from the inverted troughs of the remaining collector. The rods by which the electrodes are thus suspended are connected to the inverted troughs of the gas collectors by gas-tight insulators 27' and each rod may, if desired, be surrounded by a glass tube 28 or other suitable insulator to avoid danger of short circuits. In practice the top edge of each electrode is spaced below the bottom edges of the overlying collector trough. As shown in Fig. 7, the back part of the collectors are indented as indicated at 30 to leave sufficient clearance between the collectors and the adjacent walls of the tank for the passage of the busbar connections 23 and 26.

It will thus be seen that the present invention provides an electrolytic cell construction of the tank type which is completely self-contained and in which no superstructure or external supporting means are needed. The diaphragms 7 are removably secured to the diaphragm frames 9 which may be bolted together to form a rigid diaphragm structure and yet permit the easy removal of one or more frames for replacement if necessary. The frames 9 rest upon and are supported by the bottom of the tank and removably support the gas collectors 17a on their upper edges by means of the channels sections 16. These gas collectors, in turn, support the anodes 12 and cathodes 13 and the current distributing plates 22 and 25 which are rigidly secured thereto, so that the entire anode or cathode assembly may at any time be separately removed from the tank simply by lifting out the corresponding gas collector.

Another structural advantage of the present invention lies in the facility with which the hollow vertical electrodes 12 and 13 are supplied with fresh water through the openings 8 of the feed pipe 6. Since electrolyte containing gas is lighter than ordinary electrolyte it follows that there will be a tendency for the electrolyte to flow upwardly between the anodes and cathodes and downwardly through the individual hollow electrodes. The direct introduction of feed water through the openings 8 into the recirculating stream of electrolyte in each electrode compartment results in a uniform composition of electrolyte throughout the cell and makes it possible to use deeper electrodes than would otherwise be feasible.

With the electrode arrangement described herein there is very little danger of trouble due to short circuits. In case of iron deposits between the top edges of the cathodes and the diaphragm frames it is a very simple matter to raise the cathode block and wash away the loose iron. It will also be seen that the only way in which gas can mix is through holes developing in the diaphragm. Trouble due to the building up of excessive oxygen or hydrogen pressure is avoided; the construction is such that oxygen or hydrogen may bubble to atmosphere via the bottom edge of the collector and the channel.

Having described what is now considered the preferred embodiment of this invention, various modifications in the construction and arrangement of parts may be resorted to within the scope and spirit of the appended claims. For example, the electrodes of each set may be of any desired shape that will afford the requisite circulating passages for the electrolyte and may be rigidly interconnected in any desired manner to facilitate placement and removal thereof.

Having thus described my invention, what I claim is:

1. An electrolytic cell comprising in combination a tank, a plurality of rigid vertical diaphragm frames supported in and by said tank, said frames being removably connected at alternate ends to form a continuous structure with the orifices of said frames in alignment, a separate diaphragm fastened across the orifice of each diaphragm frame, a channel on the upper longitudinal edge of each frame, electrodes of opposite polarity mounted on opposite sides of each diaphragm, gas collectors over said electrodes having depending sides seated in and supported by said channels, and insulated suspending members supporting said electrodes from said gas collectors.

2. An electrolytic cell comprising in combination a tank, a plurality of rigid vertical diaphragm frames supported in and by said tank in planes parallel to a pair of opposite side walls thereof, said frames being of a length less than the length of said side walls and being removably connected at alternate ends to form a continuous structure spaced from the end walls of the tank, a channel on the upper longitudinal edge of each frame, horizontal angles forming channels on the side walls of the tank opposite the channels on the frames, an electrode between each pair of frames and between the two outside frames and the side walls of the tank, gas collectors over said electrodes having depending sides seated in and supported by said channels, and insulated suspending members supporting said electrodes from said gas collectors.

WILLIAM J. ROSENBLOOM.